G. M. CLARK & A. HARRIS.
SOLDERING PROCESS.

No. 191,405.  Patented May 29, 1877.

Attest,
W. C. Corlies.
E. S. Lloyd.

Inventors,
George M. Clark & Arthur Harris.
By [signature]
Attys.

UNITED STATES PATENT OFFICE.

GEORGE M. CLARK AND ARTHUR HARRIS, OF CHICAGO, ILLINOIS.

IMPROVEMENT IN SOLDERING PROCESSES.

Specification forming part of Letters Patent No. 191,405, dated May 29, 1877; application filed February 19, 1877.

*To all whom it may concern:*

Be it known that we, GEORGE M. CLARK and ARTHUR HARRIS, of the city of Chicago, in the county of Cook and State of Illinois, have invented a new and useful Improvement in a Process for Soldering Tin Cans, which is fully described in the following specification, reference being had to the accompanying drawings, in which—

Figure 1:
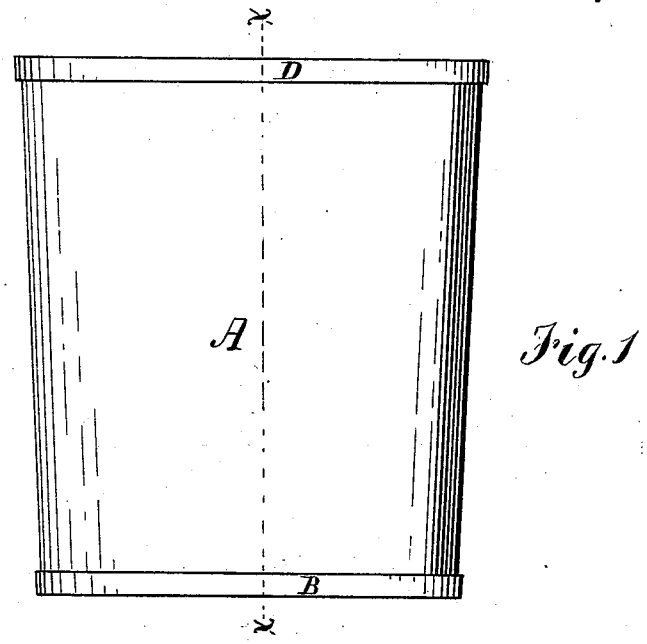
Figure 2:
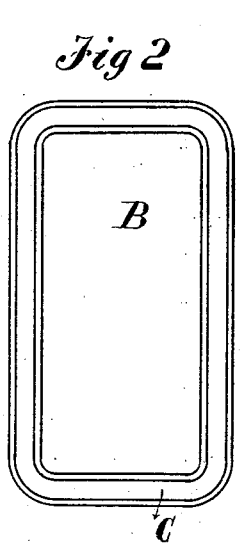
Figure 3:
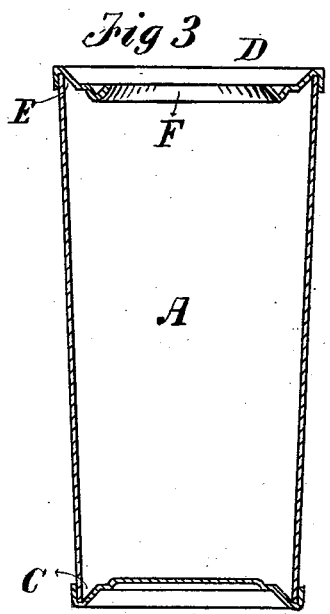
Figure 4:
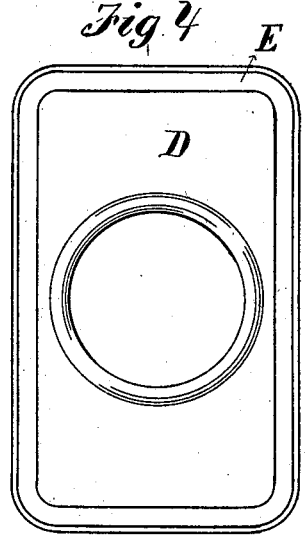

Figure 1 is a perspective view of the cans which we are making. Fig. 2 is a plan view of the inside bottom plate. Fig. 3 is a transverse sectional view of the can, and Fig. 4 is an inside view of the top plate of the can.

Our invention relates to a new and useful process of soldering tin cans without the use of soldering-irons; and consists in heating the joint to be soldered to a high temperature, as high as the tin will bear without burning, or becoming discolored, and then, after applying resin, either in the powdered or liquid form, pouring into the joint molten solder.

The solder flows and fills the joint on account of its being heated to a high temperature. The necessary requisite to our invention is to have the parts of the can which constitute or form the joints to be soldered, heated, so that the solder, which must also be in a liquid state, will flow in the joint and fill it.

In the drawings, A is the body of the can, which is formed up and soldered in the usual manner. B is the bottom plate, with the edges turned up, forming a groove, C. D is the top plate, with its edges turned, forming a groove, E. F is an opening in the top, through which the can is filled.

The top and bottom plates are stamped into the shape shown, and the top plate first slipped upon the top of the can, as shown in Fig. 3. The can is then inverted and placed upon a hot metal plate, so that the joint may become heated uniformly, and to as high a temperature as it will bear without scorching or discoloring the tin. We then put some resin about the joint in the ordinary manner of preparing it for soldering, and then take a ladle or similar article, and pour melted solder into the groove E, and it immediately flows around and fills the heated joint, soldering the same more perfectly than can be done with a soldering-iron. We then slip the bottom plate B upon the can, as shown in Fig. 3, and set the can upon the heated plate, so as to heat the bottom joint the same as above described in reference to the joint that secures the top to the can. The resin is then applied, and the molten solder poured into the groove C by passing the ladle through the opening F. The molten solder at once flows and fills the joint, soldering it the same as above described.

In order to make the solder flow a little more closely to the joint, and also in order to heat just the part where the solder is required to flow uniformly, it is important that the joint be made in a groove.

We find we facilitate our process of soldering by placing the can upon a heated plate that is slightly inclined. The operator, after pouring the liquid solder into the groove, turns the can around while still resting upon the heated plate, when the solder flows down the inclined groove and fills the joint. This enables the operator to pour all the melted solder into the groove at one place.

It will be observed that, in the manufacture of large numbers of cans or other articles having heads and other seams to be soldered, where a soldering-iron cannot be conveniently used, a very great saving is made by the use of our process of heating the joint and pouring in molten solder, as above described.

We are aware that joints have been heated preparatory to soldering, and the solder laid on cold; but the purpose was to heat sufficiently to melt the solder when applied. This requires a high temperature, which is very liable to scorch the tin, and there is great inconvenience in applying the solder cold and relying upon its contact with the tin to melt it and heat it sufficiently, so that it will flow readily. We melt the solder separately, and only heat the joint to a sufficiently high temperature, so that the melted solder, when poured upon the joint, will at once flow and fill the joint. We avoid the great danger of scorching the tin, and, by using melted solder, are enabled to solder tin cans with great facility.

Having thus described our invention, what we claim, and desire to secure by Letters Patent, is—

As an improvement in the art of soldering metallic seams, the process herein described, consisting in first heating the joint to be sealed, and then pouring on molten solder, substantially as described.

GEORGE M. CLARK.
ARTHUR HARRIS.

Witnesses:
L. A. BUNTING,
E. S. LLOYD.